(12) United States Patent
Matsukuma et al.

(10) Patent No.: US 10,794,279 B2
(45) Date of Patent: Oct. 6, 2020

(54) COMPRESSED AIR ENERGY STORAGE POWER GENERATION DEVICE

(71) Applicant: KOBE STEEL, LTD., Hyogo (JP)

(72) Inventors: Masaki Matsukuma, Takasago (JP); Ayaka Nagahira, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 16/490,706

(22) PCT Filed: Mar. 23, 2018

(86) PCT No.: PCT/JP2018/011741
§ 371 (c)(1),
(2) Date: Sep. 3, 2019

(87) PCT Pub. No.: WO2018/181007
PCT Pub. Date: Oct. 4, 2018

(65) Prior Publication Data
US 2020/0003116 A1 Jan. 2, 2020

(30) Foreign Application Priority Data
Mar. 29, 2017 (JP) .................. 2017-066420

(51) Int. Cl.
*F02C 6/16* (2006.01)
*F02C 1/02* (2006.01)
*H02J 15/00* (2006.01)

(52) U.S. Cl.
CPC .................. *F02C 6/16* (2013.01); *F02C 1/02* (2013.01); *H02J 15/006* (2013.01)

(58) Field of Classification Search
CPC .......... F02C 6/16; H02J 15/006; Y02E 60/15; F03D 9/17; F28D 2021/0047
USPC .......................................... 60/659
See application file for complete search history.

(56) References Cited

U.S. PATENT DOCUMENTS

| 5,317,904 A | * | 6/1994 | Bronicki | F02C 6/16 60/659 |
| 5,537,822 A | * | 7/1996 | Shnaid | F02C 6/04 60/650 |
| 5,634,340 A | * | 6/1997 | Grennan | F02C 1/02 60/648 |

(Continued)

FOREIGN PATENT DOCUMENTS

| JP | H0354325 A | 3/1991 |
| JP | H04191419 A | 7/1992 |
| JP | 2008-061382 A | 3/2008 |

*Primary Examiner* — Mark A Laurenzi
*Assistant Examiner* — Mickey H France
(74) *Attorney, Agent, or Firm* — Studebaker & Brackett PC

(57) ABSTRACT

This compressed air storage power generation device 10 is provided with: a power demand receiving unit 60; a cold heat demand receiving unit 61; a power supply adjustment device 19 which adjusts the amount of power generated by a generator 15; a cold heat supply adjustment valve 22 which adjusts the amount of cold heat supplied from a first heat medium storage unit 21 to consumer equipment 3; and a control device which controls the power supply adjustment device 19 and the cold heat supply adjustment valve 22 so as to supply the consumer equipment 3 with power and cold heat corresponding to the power demand value and the cold heat demand value.

6 Claims, 9 Drawing Sheets

(56) References Cited

U.S. PATENT DOCUMENTS

2005/0275225 A1\* 12/2005 Bertolotti .................. F03D 9/17
                                                        290/44
2018/0156110 A1    6/2018 Matsukuma et al.
2018/0347459 A1  12/2018 Matsukuma et al.

\* cited by examiner

COMPRESSED AIR ENERGY STORAGE POWER GENERATION DEVICE

TECHNICAL FIELD

The present disclosure relates to a compressed air energy storage power generation device.

BACKGROUND ART

Since power generation utilizing renewable energy such as wind power generation or photovoltaic power generation depends upon meteorological conditions, the output may be unstable. Therefore, in order to obtain necessary power in a timely manner, there is a need to use an energy storage system. As an example of such a system, for example, a compressed air energy storage (CAES) power generation device is known.

The CAES power generation device is a device in which a compressor is driven by means of renewable energy to produce compressed air, the compressed air is stored in a tank or the like, and a turbine power generator is driven by using the compressed air when needed to obtain power. Such a CAES power generation device is disclosed, for example, in Patent Document 1.

CITATION LIST

Patent Document

Patent Document 1: JP 2016-211466 A

SUMMARY OF THE INVENTION

Problem to be Solved by the Invention

In Patent Document 1, the configuration of a general CAES power generation device is disclosed, but supplying power and cold heat generated by the CAES power generation device as needed in a timely manner to a supply destination (consumer facility) is not discussed in detail.

The embodiments of the present invention have been made in these circumstances and an object thereof is to supply required amounts of power and cold heat to a consumer facility in a timely manner by using a compressed air energy storage power generation device.

Means for Solving the Problem

A compressed air energy storage power generation device according to an embodiment of the present invention is a compressed air energy storage power generation device capable of accumulating renewable energy in a form of compressed air, generating power by using the compressed air as necessary, and supplying power to a consumer facility, including: a power demand receiving unit which receives a power demand value of the consumer facility; a cold heat demand receiving unit which receives a cold heat demand value of the consumer facility; an electric motor driven by power generated by use of the renewable energy; a compressor driven by the electric motor; a pressure accumulation unit which accumulates the compressed air compressed by the compressor; an expander driven by the compressed air supplied from the pressure accumulation unit; a power generator driven by the expander; a power adjustment unit which adjusts the amount of power generated by the power generator; a first heat exchanger which cools a first heat medium by exchanging heat between the first heat medium and cold air exhausted from the expander; a first heat medium storage unit which stores as cold heat the first heat medium cooled in the first heat exchanger; a cold heat adjustment unit which adjusts the supply amount of the cold heat from the first heat medium storage unit to the consumer facility; and a control device which controls the power adjustment unit and the cold heat adjustment unit so as to supply the consumer facility with the power and the cold heat according to the power demand value received by the power demand receiving unit and the cold heat demand value received by the cold heat demand receiving unit.

According to this configuration, energy whose output is irregularly fluctuating such as renewable energy can be stored in the pressure accumulation unit as compressed air, and power can be generated by supplying the compressed air to the expander when needed and driving the power generator. Moreover, the first heat medium can be cooled in the first heat exchanger by use of the cold air exhausted from the expander, and the cooled first heat medium can be used as necessary by storing it in the first heat medium storage unit. Moreover, the power demand value and the cold heat demand value of the consumer facility are received respectively by the power demand receiving unit and the cold heat demand receiving unit, and therefore it is possible to understand power and cold heat required by the consumer facility in a timely manner. Further, by the power adjustment unit and the cold heat adjustment unit, it is possible to supply required amounts of power and cold heat to the consumer facility. Thus, by using the compressed air energy storage power generation device, it is possible to supply the required amounts of power and cold heat to the consumer facility in a timely manner.

Moreover, according to this configuration, by supplying power and cold heat together, it is possible to improve energy efficiency of the device. A coefficient of performance COP which is one of indicators of energy efficiency is defined at a ratio of the output power energy and heat energy to the input power energy. Therefore, compared to the case where only power is supplied, COP can be improved by an amount of energy of cold heat to be supplied.

Moreover, according to this configuration, even if the consumer facility is located far away from a main power generation facility such as a thermal power plant or a nuclear power plant, although there is a need to install large-scale transmission system, a CAES power generation device is capable of being installed at any place, so can be installed in the vicinity of the consumer facility. Therefore, large-scale transmission system becomes unnecessary. Thus, the present device is particularly effective in the case where the consumer facility is located far away from the main power generation facility such as a thermal power plant or a nuclear power plant. Moreover, the CAES power generation device is excellent in environmental properties because of discharging no environmental load substance, and has a longer service life compared to other power generation facilities and is also excellent in durability.

The compressed air energy storage power generation device may further include: a hot heat demand receiving unit which receives a hot heat demand value of the consumer facility; a second heat exchanger which heats a second heat medium by exchanging heat between the second heat medium and air discharged from the compressor; a second heat medium storage unit which stores as hot heat the second heat medium heated in the second heat exchanger; and a hot heat adjustment unit which adjusts the supply amount of the hot heat from the second heat medium storage unit to the consumer facility, and the control device may control the power adjustment unit, the cold heat adjustment unit and the hot heat adjustment unit so as to supply the consumer facility with the power, the cold heat and the hot heat according to the power demand value received by the power demand receiving unit, the cold heat demand value received by the cold heat demand receiving unit and the hot heat demand value received by the hot heat demand receiving unit.

According to this configuration, the second heat medium can be heated in the second heat exchanger by use of hot air discharged from the compressor, and the heated second heat medium can be used as necessary by storing it in the second heat medium storage unit. Moreover, the hot heat demand value is received by the hot heat demand receiving unit, and therefore it is possible to understand hot heat required by the consumer facility in a timely manner. Further, by the hot heat adjustment unit, it is possible to supply required amount of hot heat to the consumer facility. Thus, by using the compressed air storage power generation device, it is possible to supply the required amount of hot heat to the consumer facility in a timely manner. Moreover, by supplying power, cold heat and hot heat together, it is possible to further improve energy efficiency of the device.

The compressed air energy storage power generation device may further include: a third heat exchanger which heats a third heat medium by exchanging heat between the third heat medium and air discharged from the compressor; a third heat medium storage unit which stores as hot heat the third heat medium heated in the third heat exchanger; and a hot heat absorption refrigerator which obtains cold heat by use of the hot heat of the third heat medium stored in the third heat medium storage unit.

According to this configuration, by the hot heat absorption refrigerator, the hot heat obtained in the third heat exchanger can be converted into cold heat, and more cold heat can be obtained. This is particularly effective in the case where the consumer facility requires a lot of cold heat.

The compressed air energy storage power generation device may further include an electric cooler which obtains cold heat by use of power generated in the power generator.

According to this configuration, by the electric cooler, the power generated in the power generator can be converted into cold heat, and more cold heat can be obtained. This is particularly effective in the case where the consumer facility requires a lot of cold heat.

Effect of the Invention

According to the embodiments of the present invention, by using the compressed air energy storage power generation device, it is possible to supply required amounts of power and cold heat to the consumer facility in a timely manner.

DESCRIPTION OF EMBODIMENTS

Figure 1:
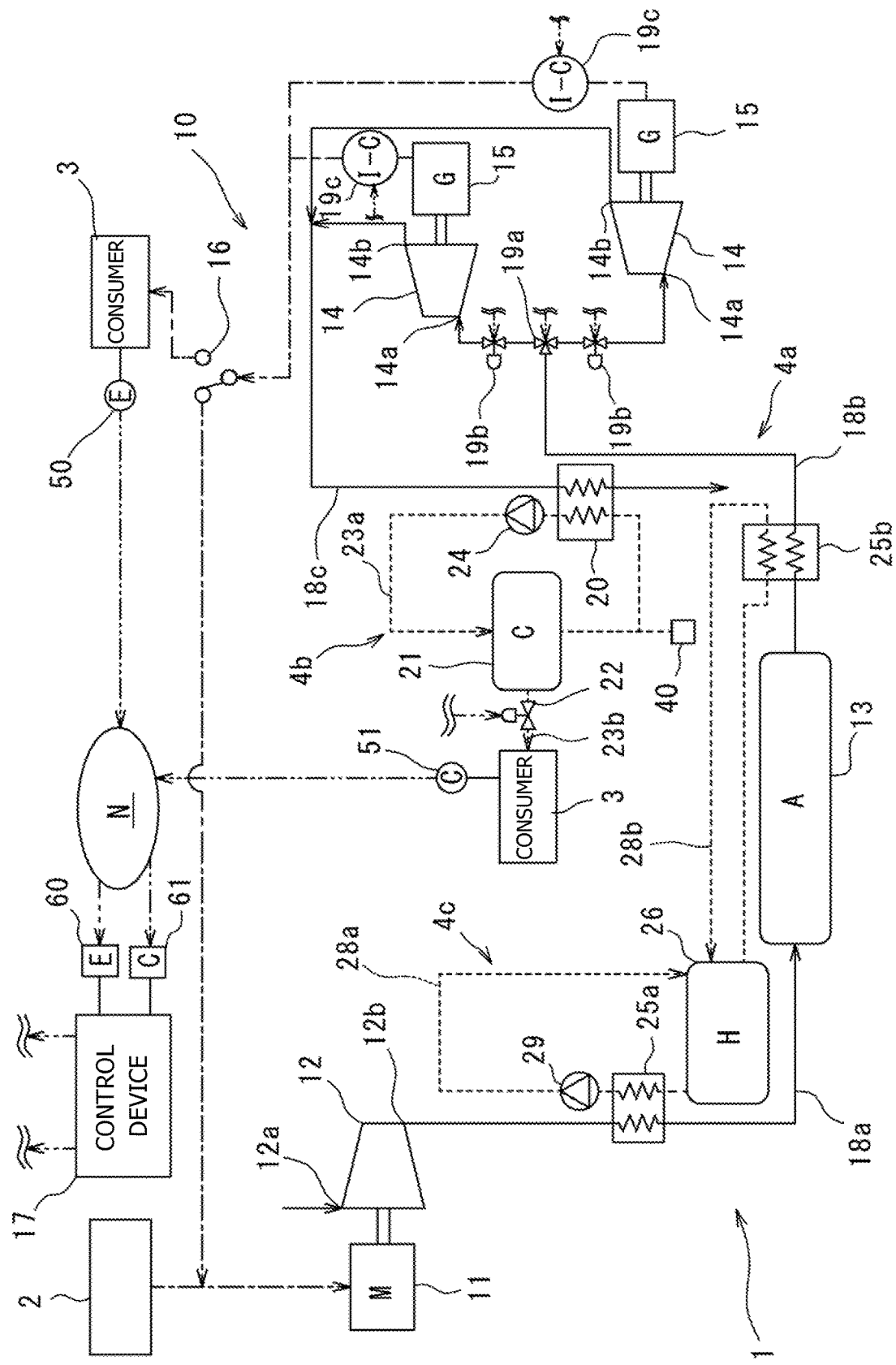
FIG. 1 is a schematic configuration diagram of a compressed air energy storage power generation device according to a first embodiment of the present invention.

Hereinafter, referring to the accompanying drawings, embodiments of the present invention will be described.

First Embodiment

A compressed air energy storage (CAES) power generation system 1 is a system for accumulating, in a form of compressed air, power generated in a power generation device 2 utilizing renewable energy such as wind power generation or photovoltaic power generation, generating power by using the compressed air as necessary, and supplying power to a consumer facility 3 in a timely manner. Further, the CAES power generation system 1 can supply cold heat generated in the system to the consumer facility 3 in a timely manner. Here, the form of the consumer facility 3 may be various, for example, such as each home or a factory. The consumer facility 3 is drawn singly in FIG. 1, but may be plural. Here, in FIG. 1, the consumer facility 3 is shown at two places, but the consumer facilities 3 at two places show the same.

The CAES power generation system 1 includes a CAES power generation device 10, and a power demand detection unit 50 and a cold heat demand detection unit 51 which are capable of transmitting data via a communication network N.

The CAES power generation device 10 includes a power generation line 4a which generates power by use of compressed air, a cold heat line 4b which extracts cold heat by use of cold air exhausted from an expander 14, and a hot heat line 4c which utilizes hot air discharged from a compressor 12. Hereinafter, these three lines will be described sequentially.

In the power generation line 4a, the CAES power generation device 10 includes a motor (an electric motor) 11, the compressor 12, a pressure accumulation tank (pressure accumulation unit) 13, the expander 14, a power generator 15, and a switch 16.

The power generated by the power generation device 2 utilizing renewable energy is supplied to the motor 11. Hereinafter, power supplied to the motor 11 from the power generation device 2 is referred to as input power. The motor 11 is mechanically connected to the compressor 12, and is driven by input power and operates the compressor 12.

The compressor 12 of the present embodiment is a screw type. The screw compressor 12 is capable of controlling rotational speed, and therefore can follow irregularly fluctuating input power with high responsiveness and is preferable as a component of the CAES power generation device 10. However, the type of the compressor 12 is not particularly limited, and in addition to a screw type, a scroll type, a turbo type, a reciprocating type or the like may be possible.

When driven by the motor 11, the compressor 12 suctions air from a suction port 12a, and compresses it and discharges the compressed air from a discharge port 12b. The discharge port 12b of the compressor 12 is fluidly connected to the pressure accumulation tank 13 through an air pipe 18a, and the compressed air discharged from the discharge port 12b is pressure-fed to the pressure accumulation tank 13.

In the present embodiment, one compressor 12 is installed, but the installation number is not particularly limited and may be plural. Particularly, if a plurality of compressors 12 are installed, in order to follow irregularly fluctuating input power with high responsiveness, the number control is possible instead of or in addition to the rotational speed control.

The pressure accumulation tank 13 is, for example, a steel tank, and accumulates the compressed air pressure-fed from the compressor 12. The pressure accumulation tank 13 is fluidly connected respectively to air supply ports 14a of the two expanders 14 through an air pipe 18b branching in two directions via a switching valve 19a, and the compressed air accumulated in the pressure accumulation tank 13 is selectively supplied to the two expanders 14 through the air pipe 18b. The switching valve 19a is controlled by a control device 17 as will be described later. In the air pipe 18b branching in two directions, air supply capacity adjustment valves 19b which is flow regulating valves are interposed respectively. The opening degree of each air supply capacity adjustment valve 19b is controlled respectively by the control device 17 described later.

The two expanders 14 of the present embodiment are the same, and are a screw type. The screw expander 14 is capable of controlling rotational speed, and therefore is preferable as a component of the CAES power generation device 10 as with the aforementioned screw compressor 12. However, the type of the expander 14 is not particularly limited, and in addition to a screw type, a scroll type, a turbo type, a reciprocating type or the like may be possible. The expander 14 is mechanically connected to the power generator 15. Therefore, the expander 14 is operated by the compressed air supplied from the air supply port 14a, and drives the power generator 15. That is, the compressed air stored in the pressure accumulation tank 13 is expanded and utilized for power generation. The expanded air is exhausted from an exhaust port 14b.

The power generator 15 is electrically connected to the consumer facility 3 and the motor 11 via an inverter 19c and the switch 16. Usually, the power generated by the power generator 15 is supplied to the consumer facility 3, but the power can be also supplied to the motor 11 by switching the switch 16. Hereinafter, the power supplied to the consumer facility 3 from the power generator 15 is referred to as output power, and the power supplied to the motor 11 is referred to as return power. Particularly, power generation utilizing renewable energy by the power generation device 2 is unstable, and therefore if power to be supplied to the motor 11 cannot be obtained, it is effective that return power can be obtained by switching the switch 16. The inverter 19c is interposed between the power generator 15 and the switch 16, and by the inverter 19c, the rotational speed of the power generator 15 can be adjusted and the amount of output power can be adjusted. Moreover, the inverter 19c of the present embodiment has also a function as a converter, and output power is subjected to conversion including DC-AC conversion to desired voltage and frequency by the inverter 19c and thereafter supplied to the consumer facility 3. The inverter 19c is controlled by the control device 17 as will be described later. Hereinafter, the switching valve 19a, the air supply capacity adjustment valve 19b and the inverter 19c are referred to all together as a power supply adjustment device (power adjustment unit) 19.

To the consumer facility 3, the power demand detection unit 50 is mounted, and detects the power required by the consumer facility 3. The form of the power demand detection unit 50 is not particularly limited, and it may be, for example, the one which calculates a power demand value from the usage amount of power in each home, the usage amount of power in a factory, or the like. The power demand value is transmitted to a power demand receiving unit 60 from the power demand detection unit 50 via the communication network N, and is used for control described later in the control device 17.

In the cold heat line 4b, the CAES power generation device 10 includes a first heat exchanger 20 and a first heat medium storage unit 21. These are fluidly connected by a heat medium pipe 23a, and a first heat medium circulates therebetween through the heat medium pipe 23a. Moreover, in the heat medium pipe 23a, a pump 24 for circulating the first heat medium is arranged. In addition, the type of the first heat medium is not particularly limited, and may be, for example, heat medium oil or water.

The first heat exchanger 20 is fluidly connected to the exhaust ports 14b of the two expanders 14 through an air pipe 18c, and air exhausted from the exhaust ports 14b of the expanders 14 is supplied to the first heat exchanger 20 through the air pipe 18c. Here, the air exhausted from the exhaust ports 14b of the expanders 14 is cold air of normal temperature or less because its heat is absorbed when it is expanded in the expander 14. In the present embodiment, the air exhausted from the exhaust ports 14b of the expanders 14 is, for example, cold air of around −50° C.

In the first heat exchanger 20, heat is exchanged between cold air in the air pipe 18c and the first heat medium of normal temperature in the heat medium pipe 23a. Specifically, in the first heat exchanger 20, air in the air pipe 18c is heated, and the first heat medium in the heat medium pipe 23a is cooled. In the present embodiment, the air in the air pipe 18c heated in the first heat exchanger 20 is of, for example, around 20° C., and the first heat medium in the heat medium pipe 23a cooled in the first heat exchanger 20 is of, for example, around 5° C. After heat exchange in the first heat exchanger 20, the air heated in the first heat exchanger 20 is exhausted to the atmosphere, and the first heat medium cooled in the first heat exchanger 20 is supplied to the first heat medium storage unit 21 through the heat medium pipe 23a and stored therein.

The first heat medium storage unit 21 is, for example, a cold water pool, and it is preferable to be insulated from the outside so as not to release cold heat to the outside. The first heat medium storage unit 21 is fluidly connected to the consumer facility 3 through the heat medium pipe 23b, and in the heat medium pipe 23b, a cold heat supply adjustment valve (cold heat adjustment unit) 22 which is a flow regulating valve is interposed. The cold heat supply adjustment valve 22 is controlled by the control device 17 as will be described later. Therefore, the first heat medium stored in the first heat medium storage unit 21 is supplied to the consumer facility 3 according to the control of the control device 17. In addition, when the first heat medium is supplied to the consumer facility 3, the circulation volume of the first heat medium in the heat medium pipe 23a is decreased, and therefore, in order to supplement this, a heat medium supply mechanism 40 is provided, and by the heat medium supply mechanism 40, the first heat medium is supplied into the heat medium pipe 23a.

In the consumer facility 3, the cold heat demand detection unit 51 is installed, and a cold heat demand value of the consumer facility 3 can be detected. The form of the cold heat demand detection unit 51 is not particularly limited, and it may be, for example, the one which calculates a cold heat demand value from the usage amount of air conditioning installation in each home, the usage amount of cold water in a factory, or the like. The cold heat demand value is transmitted to a cold heat demand receiving unit 61 from the cold heat demand detection unit 51 via the communication network N, and is used for control described later in the control device 17.

In the hot heat line 4c, the CAES power generation device 10 includes a second heat exchanger 25a, a second heat medium storage unit 26, and a return heat exchanger 25b. These are fluidly connected by heat medium pipes 28a, 28b, and a second heat medium circulates therebetween through the heat medium pipes 28a, 28b. Moreover, in the heat medium pipe 28a, a pump 29 for circulating the second heat medium is arranged. In addition, the type of the second heat medium is not particularly limited, and may be, for example, heat medium oil or water.

The second heat exchanger 25a is interposed in the air pipe 18a extending from the discharge port 12b of the compressor 12 to the pressure accumulation tank 13. The compressed air discharged from the discharge port 12b of the compressor 12 is hot air of normal temperature or more because its temperature is raised due to heat of compression when it is compressed in the compressor 12. In the present embodiment, the compressed air discharged from the exhaust port 12b of the compressor 12 is, for example, hot air of around 155° C.

In the second heat exchanger 25a, heat is exchanged between hot air in the air pipe 18a and the second heat medium of normal temperature in the heat medium pipe 28a. Specifically, in the second heat exchanger 25a, air in the air pipe 18a is cooled, and the second heat medium in the heat medium pipe 28a is heated. In the present embodiment, the air in the air pipe 18a cooled in the second heat exchanger 25a is of, for example, around 50° C., and the second heat medium heated in the second heat exchanger 25a is of, for example, around 90° C. After heat exchange in the second heat exchanger 25a, the air cooled in the second heat exchanger 25a is supplied to the pressure accumulation tank 13 and stored therein, and the second heat medium heated in the second heat exchanger 25a is supplied to the second heat medium storage unit 26 through the heat medium pipe 28a and stored therein.

The second heat medium storage unit 26 is, for example, a hot water pool, and it is preferable to be insulated from the outside so as not to release hot heat to the outside. The second heat medium storage unit 26 is fluidly connected to the return heat exchanger 25b through the heat medium pipe 28b.

The return heat exchanger 25b is interposed in the air pipe 18b extending from the pressure accumulation tank 13 to the expander 14. In the return heat exchanger 25b, heat is exchanged between air in the air pipe 18b and the second heat medium of high temperature in the heat medium pipe 28b. Specifically, in the return heat exchanger 25b, air in the air pipe 18b is heated, and the second heat medium in the heat medium pipe 28b is cooled. In the present embodiment, the air in the air pipe 18b heated in the return heat exchanger 25b is of, for example, around 70° C., and the second heat medium cooled in the return heat exchanger 25b is of, for example, around 50° C. After heat exchange in the return heat exchanger 25b, the air heated in the return heat exchanger 25b is supplied to the expander 14.

Figure 2:
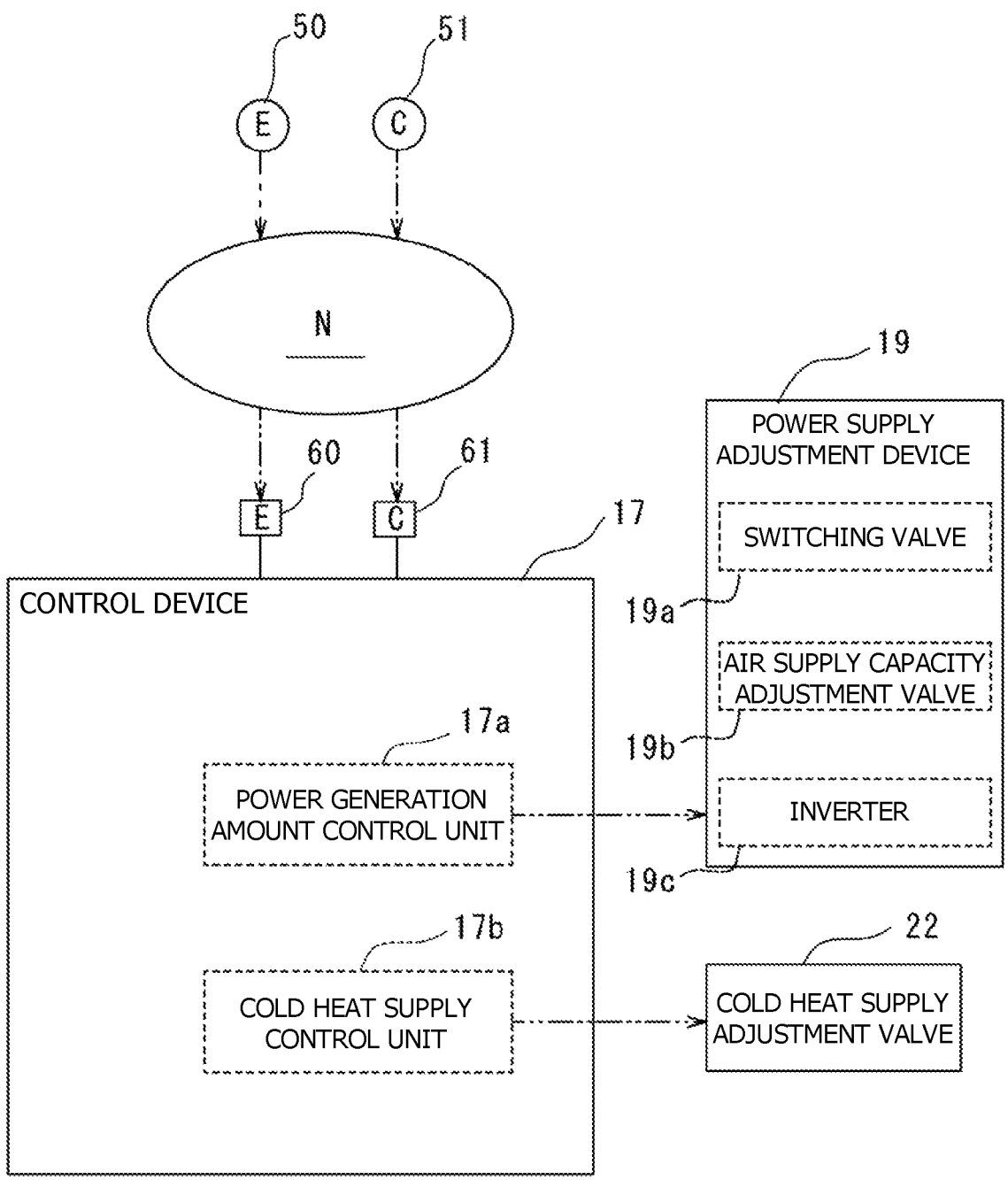
FIG. 2 is a control block diagram of the compressed air energy storage power generation device according to the first embodiment.

Referring also to FIG. 2, the CAES power generation device 10 includes the control device 17, the power demand receiving unit 60, and the cold heat demand receiving unit 61. The control device 17 is constructed by a hardware including a memory such as a CPU (Central Processing Unit), a RAM (Random Access Memory) and a ROM (Read Only Memory), and a software implemented thereon. The control device 17 is electrically connected to the power demand receiving unit 60 and the cold heat demand receiving unit 61. The power demand receiving unit 60 is a receiver which receives an electrical signal about a power demand value transmitted from the power demand detection unit 50 via the communication network N. The cold heat demand receiving unit 61 is a receiver which receives an electrical signal about a cold heat demand value transmitted from the cold heat demand detection unit 51 via the communication network N. Receiving these demand values, the control device 17 controls the power supply adjustment device 19 and the cold heat supply adjustment valve 22. Specifically, the control device 17 includes a power generation amount control unit 17a which controls the power supply adjustment device 19, and a cold heat supply control unit 17b which controls the cold heat supply adjustment valve 22.

The power generation amount control unit 17a controls the power supply adjustment device 19 consisting of three elements of the switching valve 19a, the air supply capacity adjustment valve 19b, and the inverter 19c and adjusts a generated power amount.

Firstly, the power generation amount control unit 17a adjusts the opening degree of the air supply capacity adjustment valve 19b and drives the power generator 15. Concretely, if the power demand value is larger than the current output power, the opening degree of the air supply capacity adjustment valve 19b is increased, and more compressed air is supplied to the expander 14 and the power generation amount of the power generator 15 is increased. If the power demand value detected by the power demand detection unit 50 is smaller than the current output power, the opening degree of the air supply capacity adjustment valve 19b is reduced, and less compressed air is supplied to the expander 14 and the power generation amount of the power generator 15 is reduced.

Secondly, the power generation amount control unit 17a adjusts the rotational speed command value of the inverter 19c and drives the power generator 15. Concretely, if the power demand value is larger than the current output power, the rotational speed command value is increased, the rotational speed of the power generator 15 is increased, and the power generation amount of the power generator 15 is increased. If the power demand value detected by the power demand detection unit 50 is smaller than the current output power, the rotational speed command value is reduced, the rotational speed of the power generator 15 is reduced, and the power generation amount of the power generator 15 is reduced.

Thirdly, the power generation amount control unit 17a adjusts the operating number of the expanders 14 by switching the switching valve 19a, and drives the power generator 15. Concretely, if the power demand value is larger than the current output power, outlets of the switching valve 19a are opened in two directions, and drives two expanders 14, thereby increasing the power generation amount of the power generator 15. If the power demand value detected by the power demand detection unit 50 is smaller than the current output power, one or all of the outlets of the switching valve 19a is/are closed, and one expander 14 is driven or not driven, thereby reducing the power generation amount of the power generator 15.

Adjustment of the generated power amount may be performed by independently performing control of each of the switching valve 19a, the air supply capacity adjustment valve 19b and the inverter 19c, or by performing a combination of control of those after giving a priority order. In addition, rotational speed control of the power generator 15 is not limited to control by the inverter 19c, and may be performed in any forms. Similarly, operating number control of the expanders 14 is not limited to control by the switching valve 19a, and may be performed in any forms. Particularly, the operating number of the expanders 14 is up to two in the present embodiment, but may be three or more.

According to the cold heat demand value detected by the cold heat demand detection unit 51 and received by the cold heat demand receiving unit 61, the cold heat supply control unit 17b adjusts the opening degree of the cold heat supply adjustment valve 22 and supplies required amount of cold heat to the consumer facility 3. Concretely, if the cold heat demand value is larger than the current supplying cold heat amount, the opening degree of the cold heat supply adjustment valve 22 is increased, and the cold heat supply amount is increased. Moreover, if the cold heat demand value is smaller than the current supplying cold heat amount, the opening degree of the cold heat supply adjustment valve 22 is reduced, and the cold heat supply amount is reduced.

According to the present embodiment, energy whose output is irregularly fluctuating such as renewable energy can be stored in the pressure accumulation tank 13 as compressed air, and power can be generated by supplying the compressed air to the expander 14 when needed and driving the power generator 15. Moreover, the first heat medium can be cooled in the first heat exchanger 20 by use of the cold air exhausted from the expander 14, and the cooled first heat medium can be used as necessary by storing it in the first heat medium storage unit 21. Moreover, the power demand value and the cold heat demand value of the consumer facility 3 are received respectively by the power demand receiving unit 60 and the cold heat demand receiving unit 61, and therefore it is possible to understand power and cold heat required by the consumer facility 3 in a timely manner. Further, by the power supply adjustment device 19 and the cold heat supply adjustment valve 22, it is possible to supply required amounts of power and cold heat to the consumer facility 3. Thus, by using the compressed air energy storage power generation device 1, it is possible to supply the required amounts of power and cold heat to the consumer facility 3 in a timely manner.

Moreover, according to the present embodiment, by supplying power and cold heat together, it is possible to improve energy efficiency of the device. A coefficient of performance COP which is one of indicators of energy efficiency is defined at a ratio of the output power energy (output power) and heat energy (cold heat) to the input power energy (input power). Therefore, compared to the case where only power is supplied, COP can be improved by an amount of energy of cold heat.

Moreover, according to the present embodiment, even if the consumer facility 3 is located far away from a main power generation facility such as a thermal power plant or a nuclear power plant, although there is a need to install large-scale transmission system, the CAES power generation device 10 is capable of being installed at any place, so can be installed in the vicinity of the consumer facility 3. Therefore, large-scale transmission system becomes unnecessary. Thus, the present device is particularly effective in the case where the consumer facility 3 is located far away from the main power generation facility such as a thermal power plant or a nuclear power plant. Moreover, the CAES power generation device 10 is excellent in environmental properties because of discharging no environmental load substance, and has a longer service life compared to other power generation facilities and is also excellent in durability.

Moreover, if the CAES power generation device 10 is installed in a place far away from the main power generation facility and requiring timely power supply, the CAES power generation system 1 is a so-called "local production for local consumption" which can consume renewable energy in the installed area on site. Particularly, in recent years, a FIT system (feed-in tariff system) is established, and there is a case where each home or the like generates power by use of renewable energy or the like and consumes power in each home, and transmits excess power (that is, an electric power company buys it). However, if large-scale power generation and power transmission beyond a scale of power generation in each home are performed, there is a fear that reverse flow in the existing weak transmission system is caused and the transmission system fails. In contrast, the CAES power generation device 10 of the present embodiment can define the power generation amount, and therefore failure of the transmission system can be prevented even if power transmission is performed using the existing weak transmission system.

Figure 3:
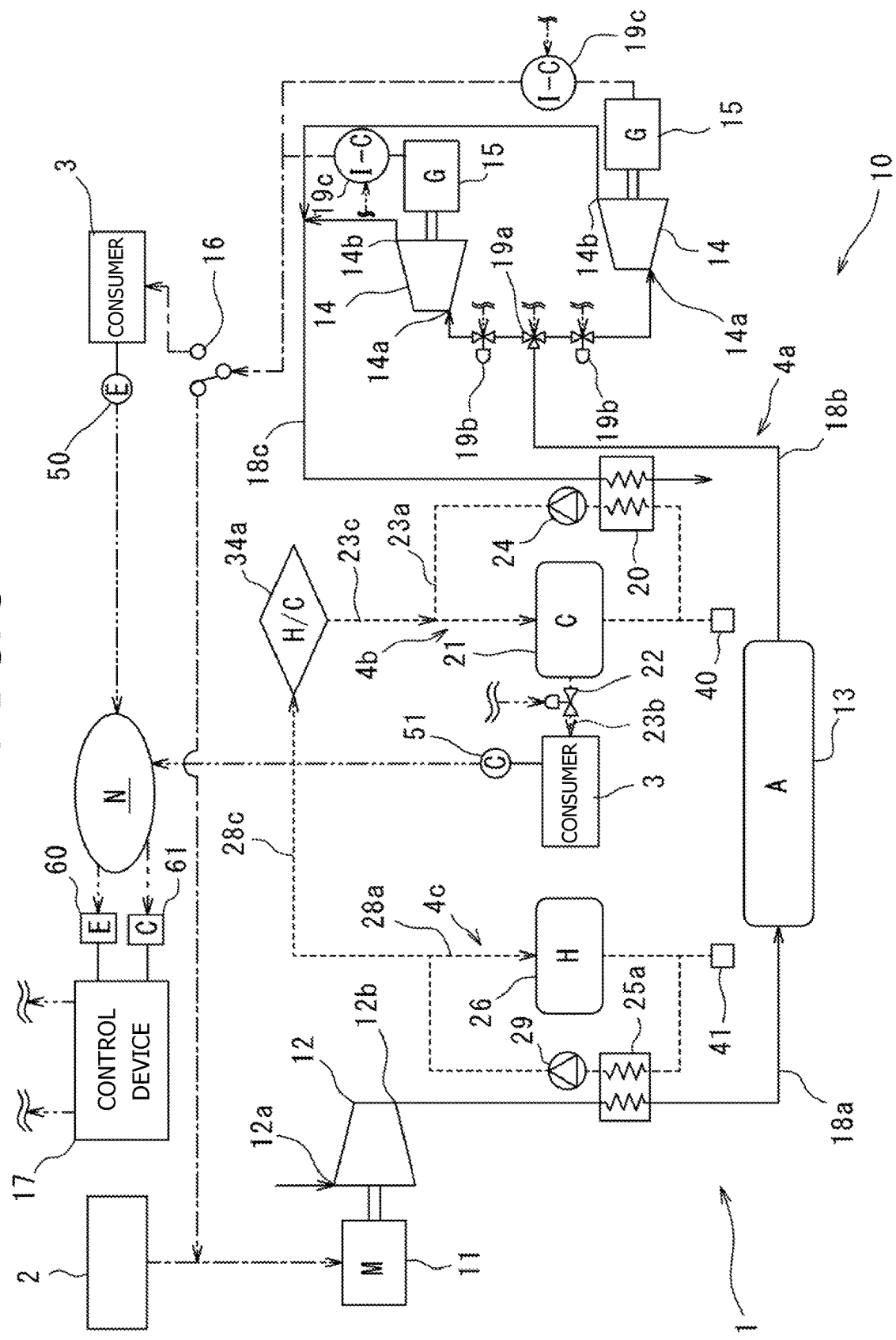
FIG. 3 is a schematic configuration diagram of a modification of the compressed air energy storage power generation device according to the first embodiment.

As shown in FIG. 3, as a modification of the present embodiment, the return heat exchanger 25b and the heat medium pipe 28b may be omitted, and a hot heat absorption refrigerator 34a and heat medium pipes 28c, 23c may be provided.

The hot heat absorption refrigerator 34a is an apparatus which converts hot heat into cold heat. The hot heat absorption refrigerator 34a of the present embodiment is a general absorption refrigerator, that is, a known one. Thus, a description of the detailed structure thereof will be omitted here. The hot heat absorption refrigerator 34a can obtain the first heat medium of, for example, around 7° C. by use of hot heat of the second heat medium of, for example, around 90° C. The hot heat absorption refrigerator 34a is fluidly connected to the heat medium pipe 28a through the heat medium pipe 28c. Further, the hot heat absorption refrigerator 34a is fluidly connected to the heat medium pipe 23a through the heat medium pipe 23c, and the first heat medium obtained in the hot heat absorption refrigerator 34a is supplied to the first heat medium storage unit 21 through the heat medium pipe 23a. Moreover, when the second heat medium is supplied to the hot heat absorption refrigerator 34a as hot heat, the circulation volume of the second heat medium in the heat medium pipe 28a is decreased, and therefore, in order to supplement this, a heat medium supply mechanism 41 is provided, and by the heat medium supply mechanism 41, the second heat medium is supplied into the heat medium pipe 28a.

According to the modification, by the hot heat absorption refrigerator 34a, the hot heat obtained in the second heat exchanger 25a can be converted into cold heat, and more cold heat can be obtained. This is particularly effective in the case where the consumer facility 3 requires a lot of cold heat.

Second Embodiment

Figure 4:
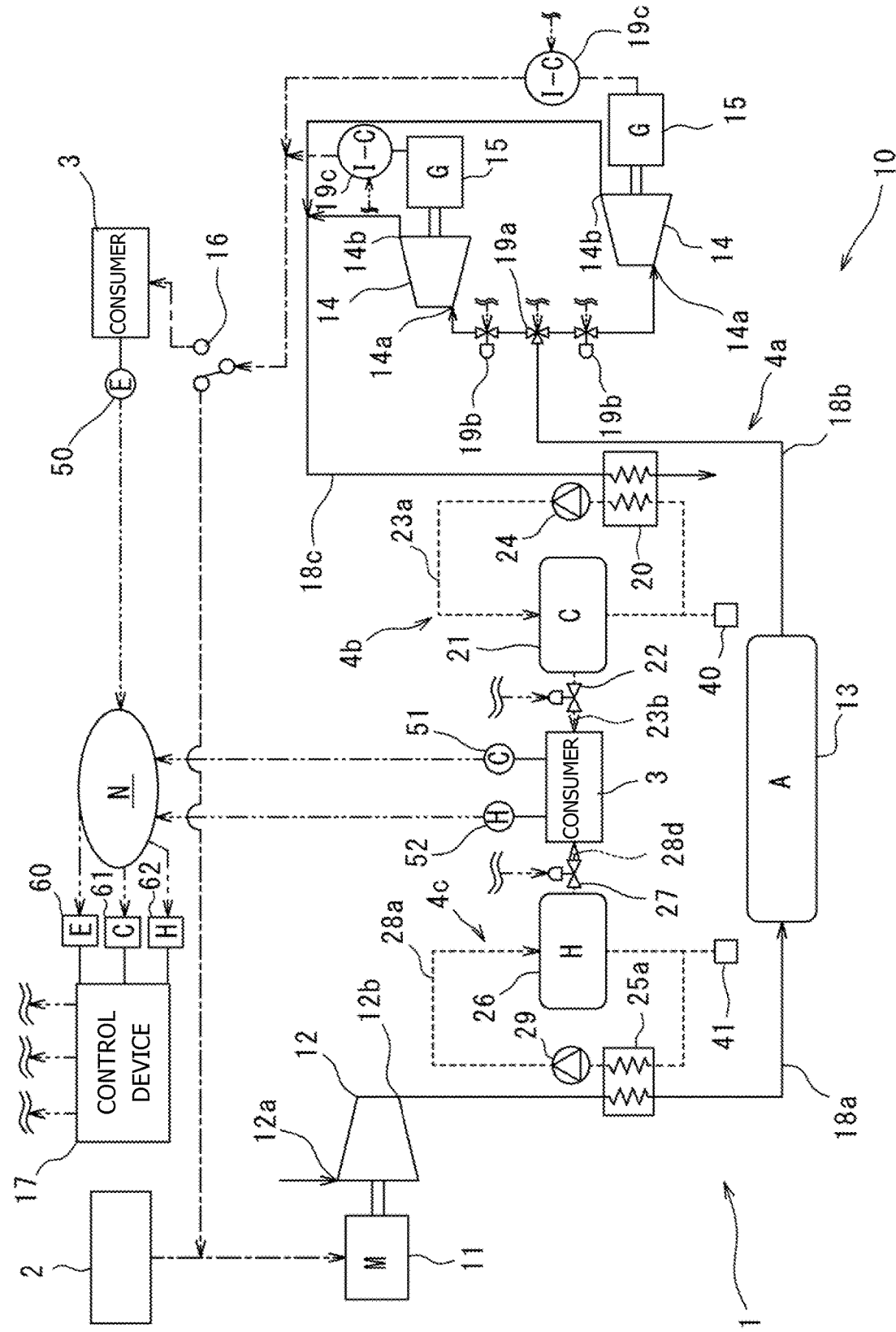
FIG. 4 is a schematic configuration diagram of the compressed air energy storage power generation device according to a second embodiment.
Figure 5:
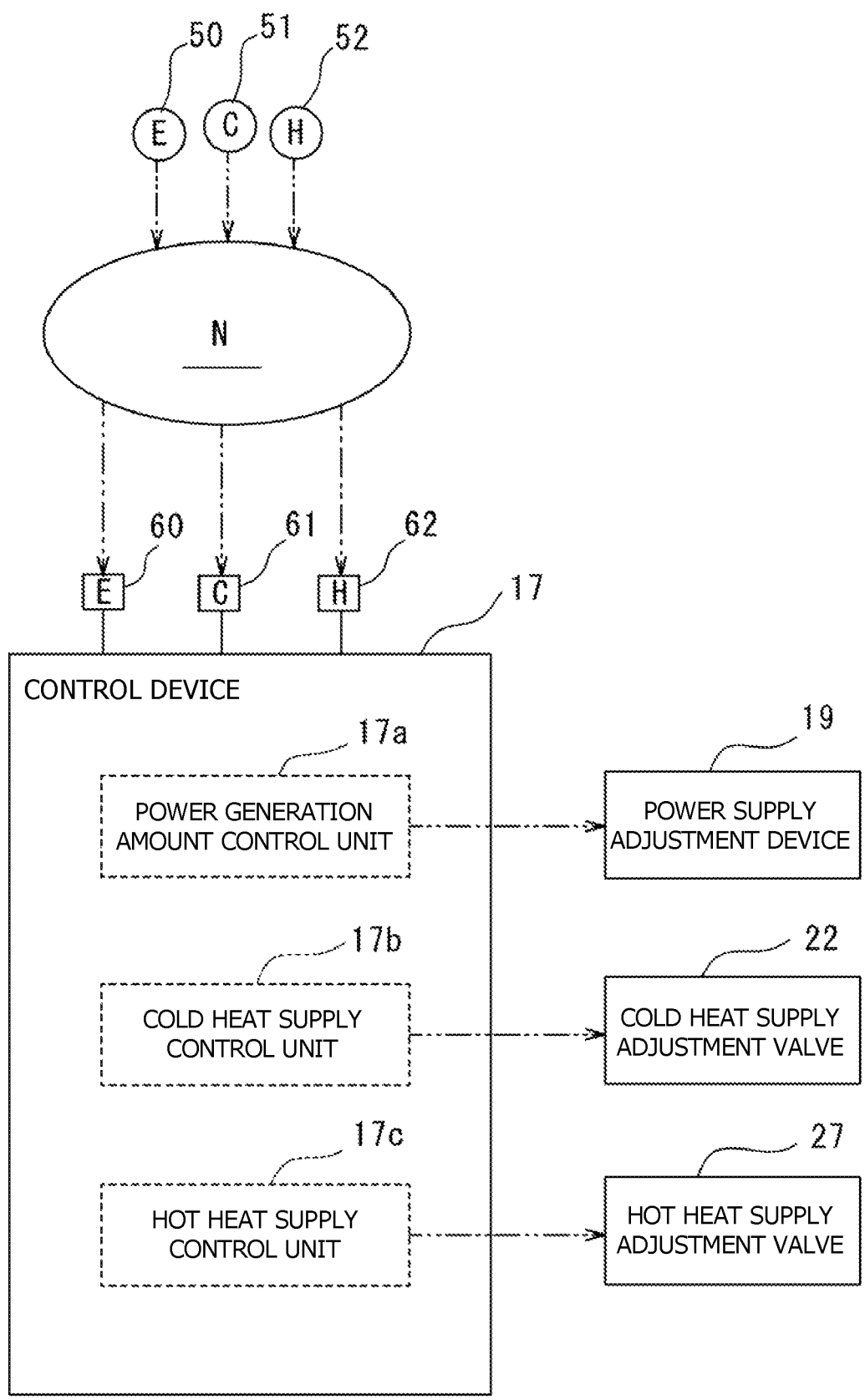
FIG. 5 is a control block diagram of the compressed air energy storage power generation device according to the second embodiment.

The CAES power generation device 10 of a second embodiment shown in FIGS. 4, 5 includes a mechanism which supplies hot heat to the consumer facility 3. The CAES power generation device 10 of the present embodiment is substantially the same as the configuration of the first embodiment in FIGS. 1, 2 except for the configuration of the mechanism. Thus, the portions same as the configuration shown in FIGS. 1, 2 are denoted by the same reference numerals, and descriptions thereof will be omitted.

The CAES power generation device 10 of the present embodiment includes a heat medium pipe 28d in which a hot heat supply adjustment valve (hot heat adjustment unit) 27 which is a flow regulating valve is interposed. The hot heat supply adjustment valve 27 is controlled by the control device 17 as will be described later. Therefore, the second heat medium stored in the second heat medium storage unit 26 is supplied to the consumer facility 3 according to the control of the control device 17. In addition, when the second heat medium is supplied to the consumer facility 3, the circulation volume of the second heat medium in the heat medium pipe 28a is decreased, and therefore, in order to supplement this, the heat medium supply mechanism 41 is provided, and by the heat medium supply mechanism 41, the second heat medium is supplied into the heat medium pipe 28a.

In the consumer facility 3, a hot heat demand detection unit 52 is installed, and a hot heat demand value of the consumer facility 3 can be detected. The form of the hot heat demand detection unit 52 is not particularly limited, and it may be, for example, the one which calculates a hot heat demand value from the usage amount of air conditioning installation in each home, the usage amount of hot water in a factory, or the like. Moreover, corresponding to the hot heat demand detection unit 52, the CAES power generation device 10 of the present embodiment includes a hot heat demand receiving unit 62. The hot heat demand receiving unit 62 is a receiver which receives an electrical signal about a hot heat demand value transmitted from the hot heat demand detection unit 52 via the communication network N. The hot heat demand value is transmitted to the hot heat demand receiving unit 62 from the hot heat demand detection unit 52 via the communication network N, and is used for control in the control device 17.

As shown in FIG. 5, the control device 17 controls the power supply adjustment device 19, the cold heat supply adjustment valve 22, and the hot heat supply adjustment valve 27. Specifically, the control device 17 includes the power generation amount control unit 17a which controls the power supply adjustment device 19, the cold heat supply control unit 17b which controls the cold heat supply adjustment valve 22, and a hot heat supply control unit 17c which controls the hot heat supply adjustment valve 27.

According to the hot heat demand value detected by the hot heat demand detection unit 52 and received by the hot heat demand receiving unit 62, the hot heat supply control unit 17c adjusts the opening degree of the hot heat supply adjustment valve 27 and supplies required amount of hot heat to the consumer facility 3. Concretely, if the hot heat demand value is larger than the current supplying hot heat amount, the opening degree of the hot heat supply adjustment valve 27 is increased, and the hot heat supply amount is increased. Moreover, if the hot heat demand value is smaller than the current supplying hot heat amount, the opening degree of the hot heat supply adjustment valve 27 is reduced, and the hot heat supply amount is reduced.

According to the present embodiment, the second heat medium can be heated in the second heat exchanger 25a by use of the hot air discharged from the compressor 12, and the heated second heat medium can be used as necessary by storing it in the second heat medium storage unit 26. Moreover, the hot heat demand is received by the hot heat demand receiving unit 62, and therefore it is possible to understand hot heat required by the consumer facility 3 in a timely manner. Further, by the hot heat supply adjustment valve 27, it is possible to supply required amount of hot heat to the consumer facility 3. Thus, by using the CAES power generation device 10, it is possible to supply the required amount of hot heat to the consumer facility 3 in a timely manner. Moreover, by supplying power, cold heat and hot heat together, it is possible to further improve energy efficiency of the device.

Third Embodiment

Figure 6:
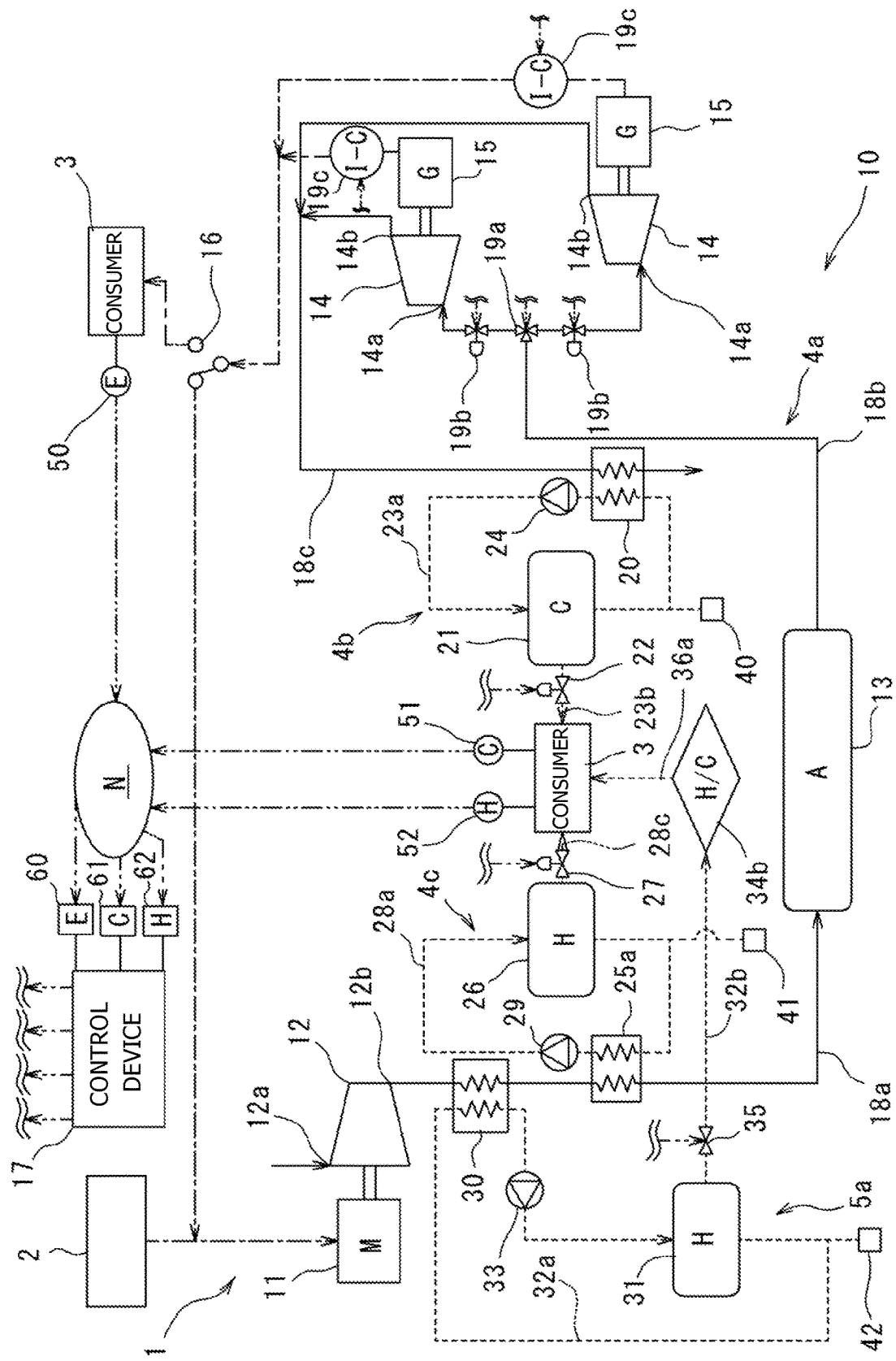
FIG. 6 is a schematic configuration diagram of the compressed air energy storage power generation device according to a third embodiment.
Figure 7:
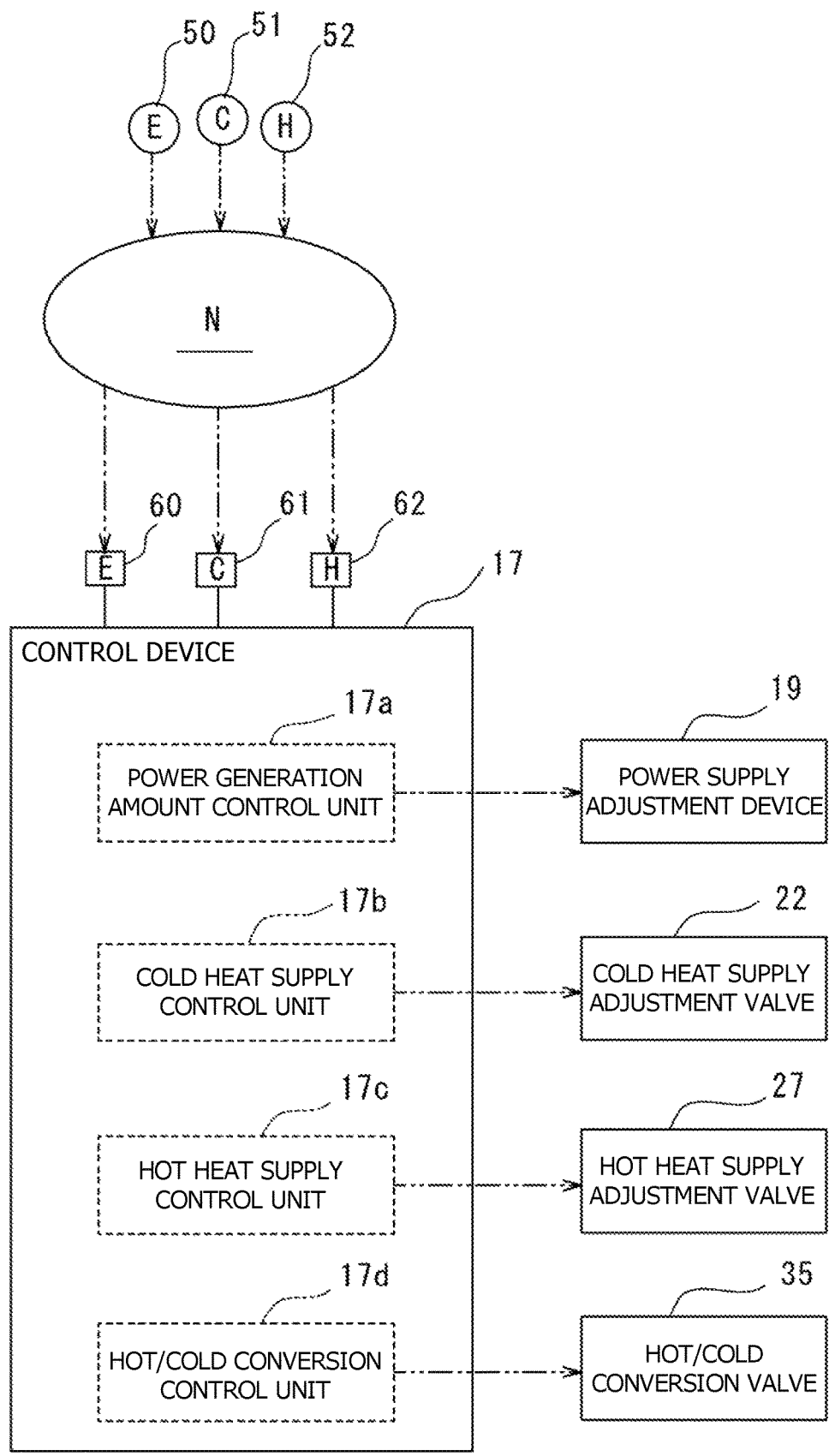
FIG. 7 is a control block diagram of the compressed air energy storage power generation device according to the third embodiment.

The CAES power generation device 10 of a third embodiment shown in FIGS. 6, 7 includes a hot/cold conversion line 5a which converts hot heat into cold heat. The CAES power generation device 10 of the present embodiment is substantially the same as the configuration of the second embodiment in FIGS. 4, 5 except for the configuration as to the hot/cold conversion line 5a. Thus, the portions same as the configuration shown in FIGS. 4, 5 are denoted by the same reference numerals, and descriptions thereof will be omitted.

The CAES power generation device 10 of the present embodiment further includes the hot/cold conversion line 5a which converts the hot air discharged from the compressor 12 into cold heat in addition to the power generation line 4a, the cold heat line 4b and the hot heat line 4c of the first embodiment.

In the hot/cold conversion line 5a, the CAES power generation device 10 includes a third heat exchanger 30 and a third heat medium storage unit 31. These are fluidly connected by a heat medium pipe 32a, and a third heat medium circulates therebetween through the heat medium pipe 32a. Moreover, in the heat medium pipe 32a, a pump 33 for circulating the third heat medium is arranged. In addition, the type of the third heat medium is not particularly limited, and may be, for example, water.

The third heat exchanger 30 is interposed in the air pipe 18a extending from the discharge port 12b of the compressor 12 to the second heat exchanger 25a. The compressed air discharged from the discharge port 12b of the compressor 12 is of normal temperature or more because its temperature is raised due to heat of compression when it is compressed in the compressor 12. In the present embodiment, the compressed air discharged from the exhaust port 12b of the compressor 12 is, for example, hot air of around 155° C.

In the third heat exchanger 30, heat is exchanged between hot air in the air pipe 18a and the third heat medium of, for example, around 85° C. in the heat medium pipe 32a. Specifically, in the third heat exchanger 30, air in the air pipe 18a is cooled, and the third heat medium in the heat medium pipe 32a is heated. In the present embodiment, the air in the air pipe 18a cooled in the third heat exchanger 30 is of, for example, around 100° C., and the third heat medium heated in the third heat exchanger 30 is of, for example, around 90° C. After heat exchange in the third heat exchanger 30, the air cooled in the third heat exchanger 30 is supplied to the second heat exchanger 25a and cooled again, for example, to around 45° C. The air cooled in the second heat exchanger 25a is supplied to the pressure accumulation tank 13 and accumulated therein. Moreover, the third heat medium heated in the third heat exchanger 30 is supplied to the third heat medium storage unit 31 through the heat medium pipe 32a and stored therein.

The third heat medium storage unit 31 is, for example, a hot water pool, and it is preferable to be insulated from the outside so as not to release hot heat to the outside. The third heat medium storage unit 31 is fluidly connected to a hot heat absorption refrigerator 34b through a heat medium pipe 32b, and in the heat medium pipe 32b, the hot heat absorption refrigerator 34b is interposed. Further, in the heat medium pipe 32b, a hot/cold conversion valve 35 is interposed between the third heat medium storage unit 31 and the hot heat absorption refrigerator 34b. The hot/cold conversion valve 35 is controlled by the control device 17 as will be described later. Therefore, the third heat medium stored in the third heat medium storage unit 31 is supplied to the hot heat absorption refrigerator 34b according to the control of the control device 17. In addition, when the third heat medium is supplied to the hot heat absorption refrigerator 34b as hot heat, the circulation volume of the third heat medium in the heat medium pipe 32a is decreased, and therefore, in order to supplement this, a heat medium supply mechanism 42 is provided, and by the heat medium supply mechanism 42, the third heat medium is supplied into the heat medium pipe 32a.

The hot heat absorption refrigerator 34b is an apparatus which converts hot heat into cold heat. The hot heat absorption refrigerator 34b of the present embodiment is a general absorption refrigerator, that is, a known one. Thus, a description of the detailed structure thereof will be omitted here. The hot heat absorption refrigerator 34b can obtain cold water of, for example, around 7° C. by use of hot heat of the third heat medium of, for example, around 90° C. The hot heat absorption refrigerator 34b is fluidly connected to the consumer facility 3 through a pipe 36a, and the cold water obtained in the hot heat absorption refrigerator 34b is supplied to the consumer facility 3 through the pipe 36a.

Referring also to FIG. 7, the control device 17 includes, as with the second embodiment, the power generation amount control unit 17a, the cold heat supply control unit 17b and the hot heat supply control unit 17c, and in the present embodiment, further includes a hot/cold conversion control unit 17d.

According to the cold heat demand value detected by the cold heat demand detection unit 51 and received by the cold heat demand receiving unit 61, the hot/cold conversion control unit 17d opens and closes the hot/cold conversion valve 35 and supplies required amount of hot heat to the hot heat absorption refrigerator 34b. Then, hot heat is converted into cold heat in the hot heat absorption refrigerator 34b, and required amount of cold heat is supplied to the consumer facility 3. Concretely, if the cold heat demand value is larger than a predetermined threshold, the hot/cold conversion valve 35 is opened, the required amount of hot heat is supplied to the hot heat absorption refrigerator 34b, hot heat is converted into cold heat, and cold heat is supplied to the consumer facility 3, thereby increasing the cold heat supply amount. Moreover, if the cold heat demand value is equal to or less than the predetermined threshold, the hot/cold conversion valve 35 is closed, and hot heat is not supplied to the hot heat absorption refrigerator 34b. Here, the predetermined threshold of the cold heat demand value represents a limit value of cold heat supply by the cold heat supply control unit 17b. That is, if the control by the cold heat supply control unit 17b cannot sufficiently supply cold heat to the consumer facility 3, the hot/cold conversion control unit 17d performs control for additionally supplying cold heat.

According to the present embodiment, by the hot heat absorption refrigerator 34b, the hot heat obtained in the third heat exchanger 30 can be converted into cold heat, and more cold heat can be obtained. This is particularly effective in the case where the consumer facility 3 requires a lot of cold heat.

Fourth Embodiment

Figure 8:
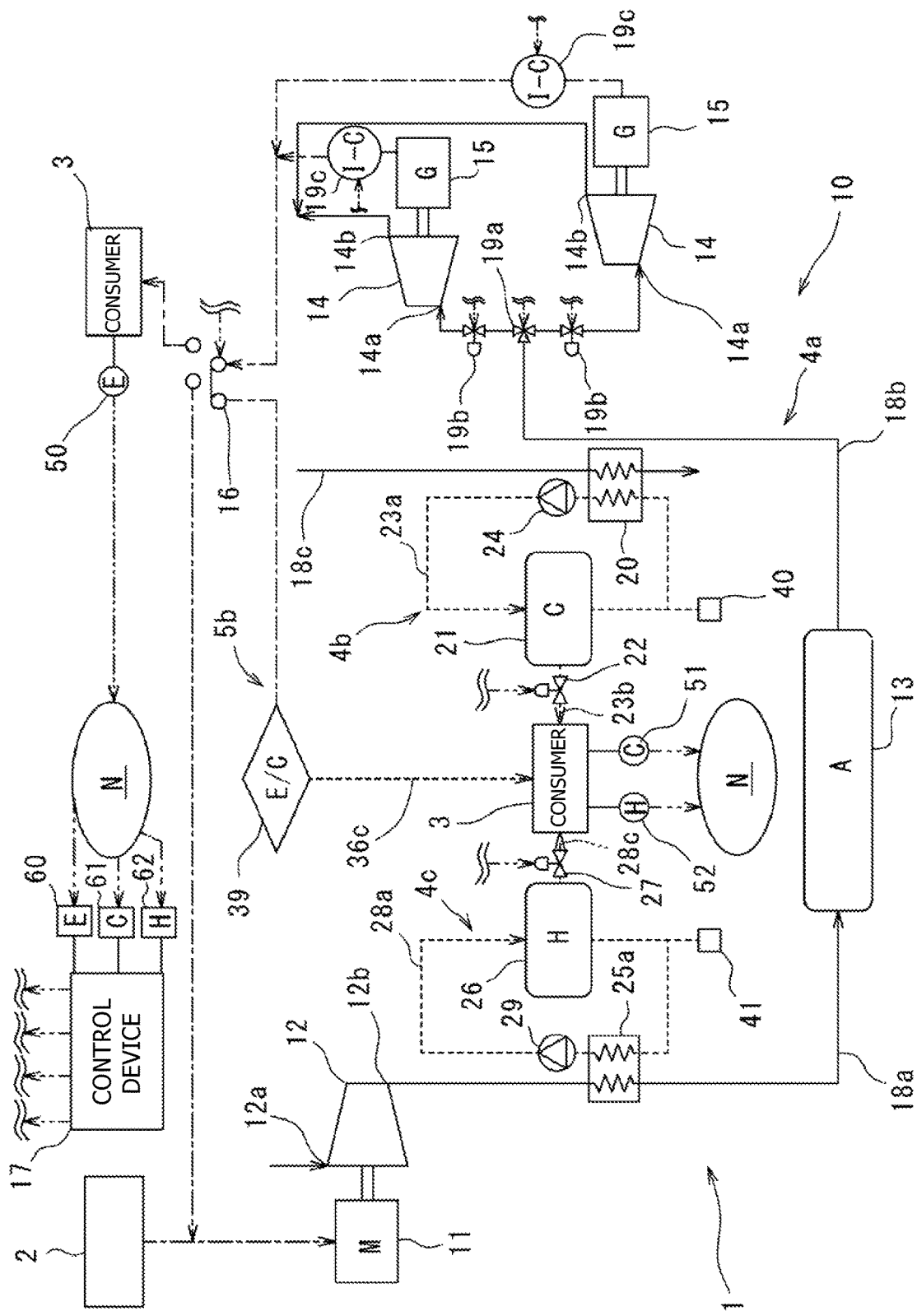
FIG. 8 is a schematic configuration diagram of the compressed air energy storage power generation device according to a fourth embodiment.
Figure 9:
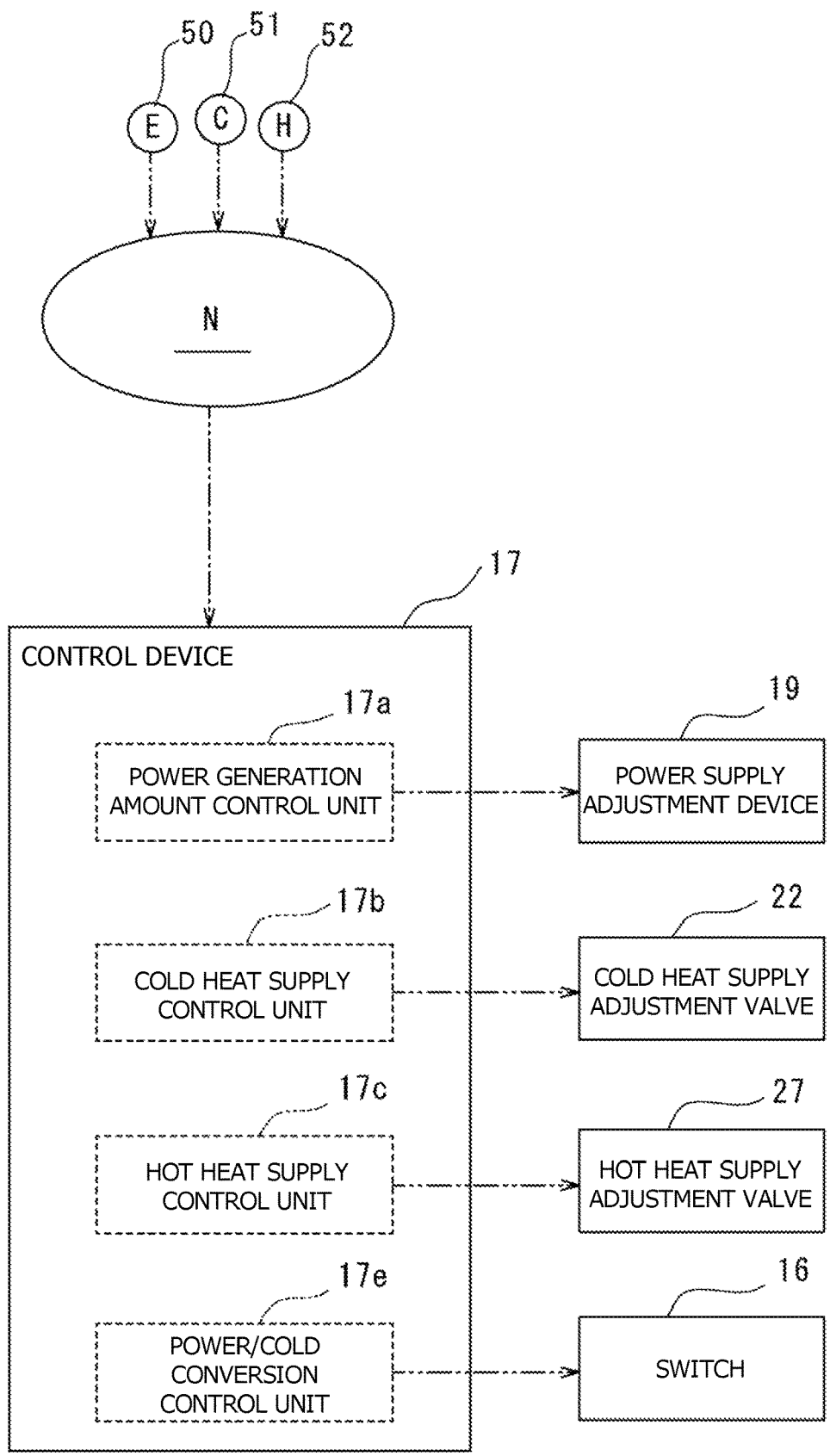
FIG. 9 is a control block diagram of the compressed air energy storage power generation device according to the fourth embodiment.

The CAES power generation device 10 of a fourth embodiment shown in FIGS. 8, 9 includes a power/cold conversion line 5b which converts power into cold heat. The CAES power generation device 10 of the present embodiment is substantially the same as the configuration of the second embodiment in FIGS. 4, 5 except for the configuration as to the power/cold conversion line 5b. Thus, the portions same as the configuration shown in FIGS. 4, 5 are denoted by the same reference numerals, and descriptions thereof will be omitted.

In the power/cold conversion line 5b, the CAES power generation device 10 includes an electric cooler 39 electrically connected to the power generator 15 via the switch 16. The switch 16 of the present embodiment can switch so as to supply the power generated in the power generator 15 to the consumer facility 3, the motor 11 or the electric cooler 39. The electric cooler 39 is an apparatus which converts power into cold heat. The electric cooler 39 of the present embodiment is a general cooler such as an air conditioner. Alternatively, the electric cooler 39 may be a cooler using a Peltier element which can obtain a cooling effect when voltage is applied.

In either case, the structure of the electric cooler 39 is a known one, and a description of the detailed structure will be omitted here. The electric cooler 39 can obtain cold water or cold air of, for example, around 7° C. by use of power. The electric cooler 39 is fluidly connected to the consumer facility 3 through a pipe 36c, and cold air obtained in the electric cooler 39 is supplied to the consumer facility 3 through the pipe 36c.

Referring also to FIG. 9, the control device 17 includes, as with the second embodiment, the power generation amount control unit 17a, the cold heat supply control unit 17b and the hot heat supply control unit 17c, and in the present embodiment, further includes a power/cold conversion control unit 17e.

According to the cold heat demand value detected by the cold heat demand detection unit 51, the power/cold conversion control unit 17e controls the switch 16 and supplies required amount of power to the electric cooler 39. Then, power is converted into cold heat in the electric cooler 39, and required amount of cold heat is supplied to the consumer facility 3. Concretely, if the cold heat demand value is larger than a predetermined threshold, the switch 16 is switched, the required amount of power is supplied to the electric cooler 39, power is converted into cold heat, and cold heat is supplied to the consumer facility 3, thereby increasing the cold heat supply amount. Moreover, if the cold heat demand value is equal to or less than the predetermined threshold, the switch 16 is switched, and power is not supplied to the electric cooler 39. Here, the predetermined threshold of the cold heat demand value represents a limit value of cold heat supply by the cold heat supply control unit 17b as with the second and the third embodiments. That is, if the control by the cold heat supply control unit 17b cannot sufficiently supply cold heat to the consumer facility 3, the power/cold conversion control unit 17e performs control for additionally supplying cold heat.

According to the present embodiment, by the electric cooler 39, the power generated in the power generator 15 can be converted into cold heat, and more cold heat can be obtained. This is particularly effective in the case where the consumer facility 3 requires a lot of cold heat.

In the embodiments described herein, power generation by renewable energy can be intended for all those utilizing energy which is routinely (or iteratively) replenished by the forces of nature such as, for example, wind power, sunlight, solar heat, wave power or tidal power, flowing water or tide and is irregularly fluctuating.

Hereinbefore, although the specific embodiments of the present invention have been described, the present invention is not limited to the above modes, and can be embodied by variously changing the modes within the gist of the present invention. For example, the mode made by appropriately combining the contents of the individual embodiments may be used as one embodiment of the present invention.

EXPLANATION OF REFERENCE NUMERALS

1: Compressed air energy storage (CAES) power generation system
2: Power generation device
3: Consumer facility
4a: Power generation line
4b: Cold heat line
4c: Hot heat line
5a: Hot/cold conversion line
5b: Power/cold conversion line
10: Compressed air energy storage (CAES) power generation device
11: Motor (Electric motor)
12: Compressor
12a: Suction port
12b: Discharge port
13: Pressure accumulation tank (Pressure accumulation unit)
14: Expander
14a: Air supply port
14b: Exhaust port
15: Power generator
16: Switch
17: Control device
17a: Power generation amount control unit
17b: Cold heat supply control unit
17c: Hot heat supply control unit
17d: Hot/cold conversion control unit
17e: Power/cold conversion control unit
18a, 18b, 18c, 18d: Air pipe
19: Power supply adjustment device (Power adjustment unit)
19a: Switching valve
19b: Air supply capacity adjustment valve
19c: Inverter
20: First heat exchanger
21: First heat medium storage unit
22: Cold heat supply adjustment valve (Cold heat adjustment unit)
23a, 23b, 23c: Heat medium pipe
24: Pump
25a: Second heat exchanger
25b: Return heat exchanger
26: Second heat medium storage unit
27: Hot heat supply adjustment valve (Hot heat adjustment unit)
28a, 28b, 28c: Heat medium pipe
29: Pump
30: Third heat exchanger
31: Third heat medium storage unit
32a, 32b: Heat medium pipe
33: Pump
34a, 34b: Hot heat absorption refrigerator
35: Hot/cold conversion valve
36a, 36b, 36c: Pipe
37: Cooling chiller
38: Pressure/cold conversion valve
39: Electric cooler
40, 41, 42: Heat medium supply mechanism
50: Power demand detection unit
51: Cold heat demand detection unit
52: Hot heat demand detection unit
60: Power demand receiving unit
61: Cold heat demand receiving unit
62: Hot heat demand receiving unit

The invention claimed is:

1. A compressed air energy storage power generation device capable of accumulating renewable energy in a form of compressed air, generating power by using the compressed air as necessary, and supplying power to a consumer facility, comprising:
a power demand receiving unit which receives a power demand value of the consumer facility;
a cold heat demand receiving unit which receives a cold heat demand value of the consumer facility;
an electric motor driven by power generated by use of the renewable energy;
a compressor driven by the electric motor;
a pressure accumulation unit which accumulates the compressed air compressed by the compressor;
an expander driven by the compressed air supplied from the pressure accumulation unit;
a power generator driven by the expander;
a power adjustment unit which adjusts the amount of power generated by the power generator;
a first heat exchanger which cools a first heat medium by exchanging heat between the first heat medium and cold air exhausted from the expander;
a first heat medium storage unit which stores as cold heat the first heat medium cooled in the first heat exchanger;
a cold heat adjustment unit which adjusts the supply amount of the cold heat from the first heat medium storage unit to the consumer facility; and
a control device which controls the power adjustment unit and the cold heat adjustment unit so as to supply the consumer facility with the power and the cold heat according to the power demand value received by the power demand receiving unit and the cold heat demand value received by the cold heat demand receiving unit.

2. The compressed air energy storage power generation device according to claim 1, further comprising:
a hot heat demand receiving unit which receives a hot heat demand value of the consumer facility;
a second heat exchanger which heats a second heat medium by exchanging heat between the second heat medium and air discharged from the compressor;
a second heat medium storage unit which stores as hot heat the second heat medium heated in the second heat exchanger; and
a hot heat adjustment unit which adjusts the supply amount of the hot heat from the second heat medium storage unit to the consumer facility, wherein the control device controls the power adjustment unit, the cold heat adjustment unit and the hot heat adjustment unit so as to supply the consumer facility with the power, the cold heat and the hot heat according to the power demand value received by the power demand receiving unit, the cold heat demand value received by the cold heat demand receiving unit and the hot heat demand value received by the hot heat demand receiving unit.

3. The compressed air energy storage power generation device according to claim 1, further comprising:
a third heat exchanger which heats a third heat medium by exchanging heat between the third heat medium and air discharged from the compressor;
a third heat medium storage unit which stores as hot heat the third heat medium heated in the third heat exchanger; and
a hot heat absorption refrigerator which obtains cold heat by use of the hot heat of the third heat medium stored in the third heat medium storage unit.

4. The compressed air energy storage power generation device according to claim 1, further comprising an electric cooler which obtains cold heat by use of power generated in the power generator.

5. The compressed air energy storage power generation device according to claim 2, further comprising:
a third heat exchanger which heats a third heat medium by exchanging heat between the third heat medium and air discharged from the compressor;
a third heat medium storage unit which stores as hot heat the third heat medium heated in the third heat exchanger; and
a hot heat absorption refrigerator which obtains cold heat by use of the hot heat of the third heat medium stored in the third heat medium storage unit.

6. The compressed air energy storage power generation device according to claim 2, further comprising an electric cooler which obtains cold heat by use of power generated in the power generator.

* * * * *